United States Patent [19]

Evans

[11] 4,029,352
[45] June 14, 1977

[54] FOLDABLE HAND RAIL

[75] Inventor: Lee T. Evans, Canon City, Colo.

[73] Assignees: Lee T. Evans; Luella Evans, both of Canon City, Colo.

[22] Filed: Apr. 7, 1976

[21] Appl. No.: 674,617

[52] U.S. Cl. .................................. 296/23 R; 52/9; 256/65

[51] Int. Cl.² ...................... B60B 3/36; E04H 17/14

[58] Field of Search .................. 256/65, 59, 66–70, 256/21, 24; 52/9, 10, 183; 182/78, 106; 296/23 R

[56] References Cited

UNITED STATES PATENTS

| | | | |
|---|---|---|---|
| 2,837,260 | 6/1958 | Kinnett | 182/106 |
| 2,861,731 | 11/1958 | Robinson | 182/106 |
| 3,401,918 | 9/1968 | Wiese | 256/59 |
| 3,858,905 | 1/1975 | Peebles | 182/106 |
| 3,964,215 | 6/1976 | Hartman et al. | 256/65 |

Primary Examiner—Andrew V. Kundrat
Assistant Examiner—Doris L. Troutman
Attorney, Agent, or Firm—Van Valkenburgh and Lowe

[57] ABSTRACT

A foldable hand rail for the side entrance of a camper trailer. The top end of the hand rail is pivotally carried in a bracket mounted upon the side of the camper trailer, and the hand rail may swing from a down-hanging, folded position alongside the camper wall to an outwardly-inclined position for use. This hand rail is supported by a strut. The bottom end of the strut is pivotally connected to a bracket upon the side of the camper trailer. It will thus swing from a folded position against the side of the camper and under the hand rail to an outwardly-inclined position where the top of the strut supports the extended end of the hand rail. A throw arm connects the hand rail and strut. One end of the throw arm is pivoted to an intermediate point on the hand rail and the other end is pivoted to the upper end of the strut. Thus, it may swing from a first position when the two components are retracted against the side of the camper trailer to an opposite position when the components are extended. A lateral stabilizer on the strut and a latch to hold the assembly together complete the organization.

6 Claims, 15 Drawing Figures

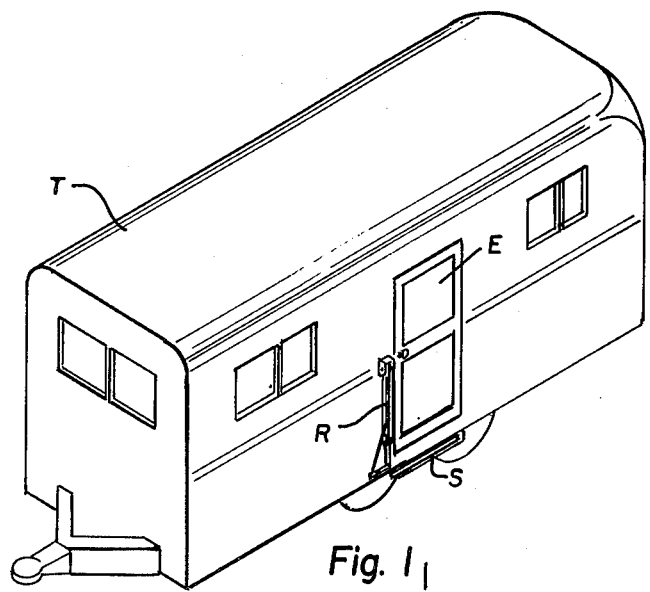
Fig. 1
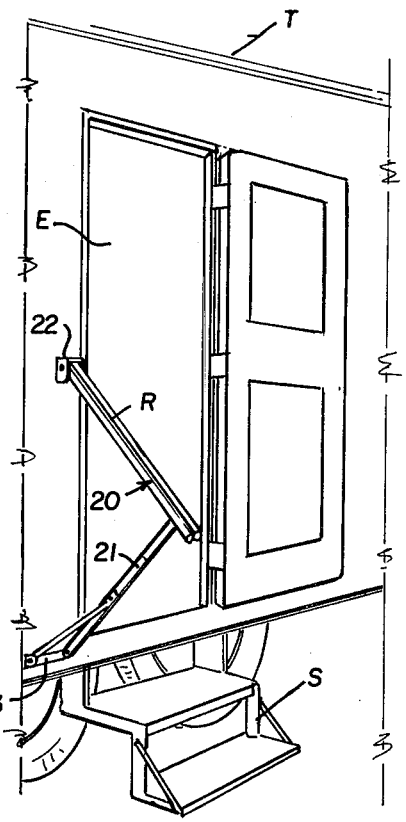
Fig. 2
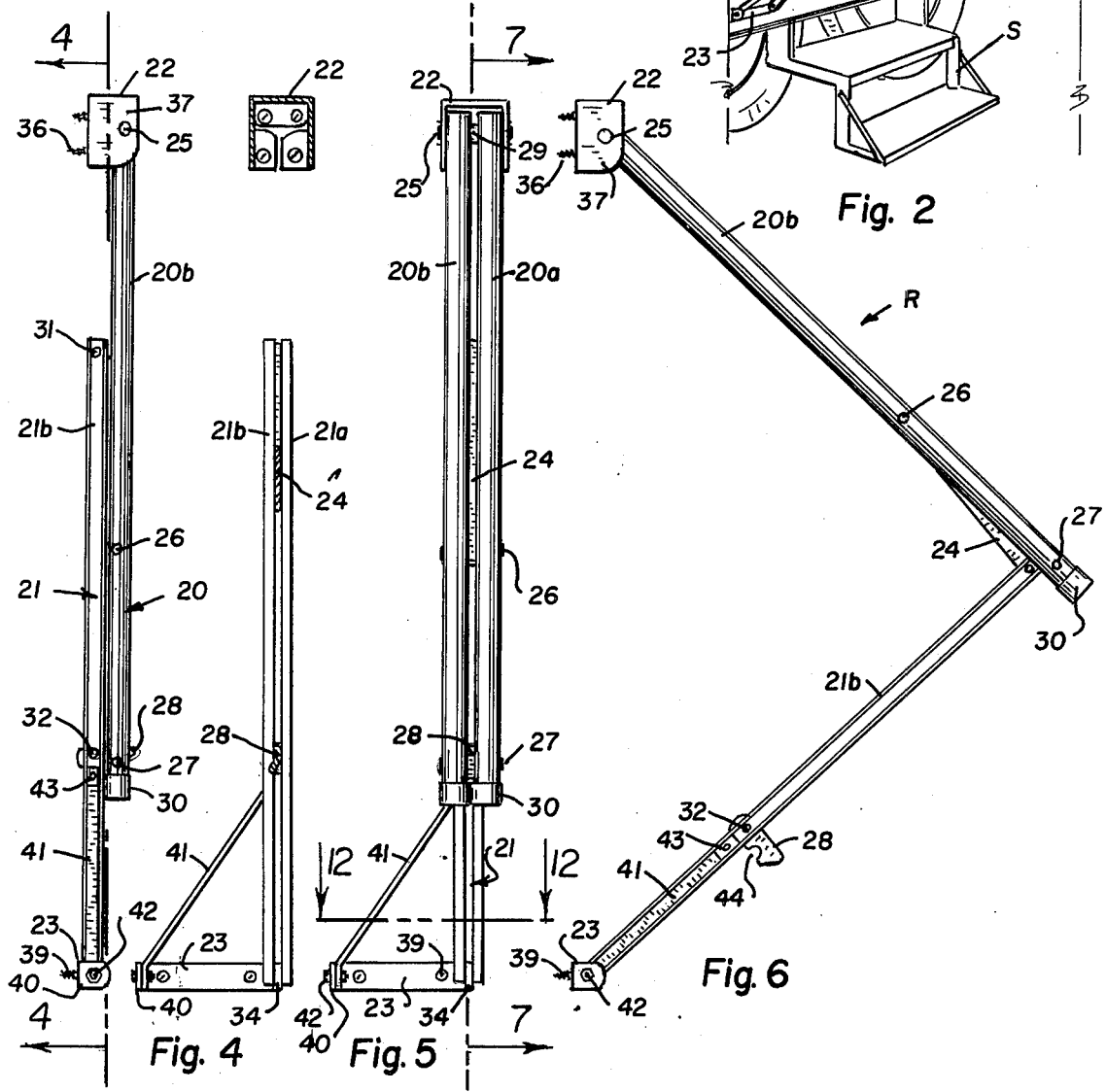

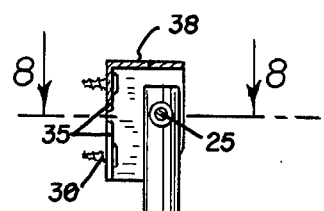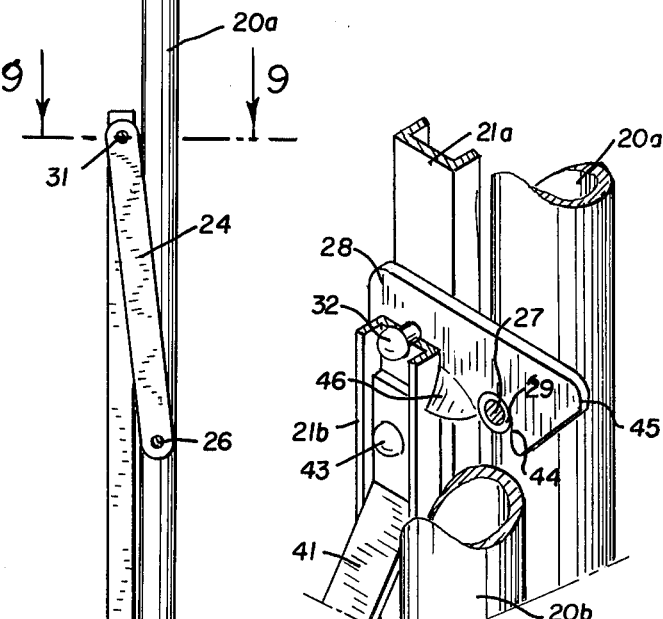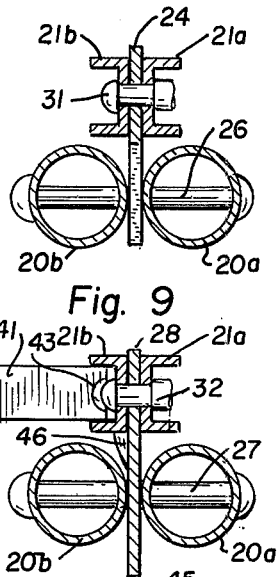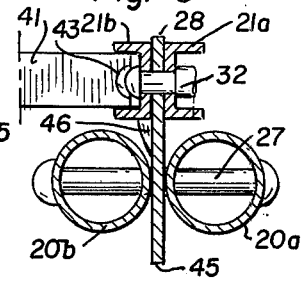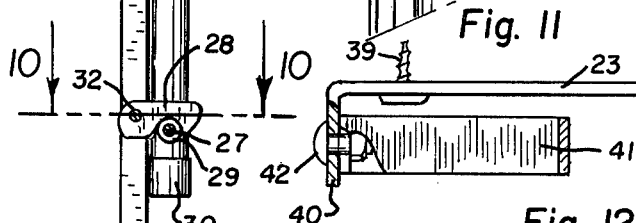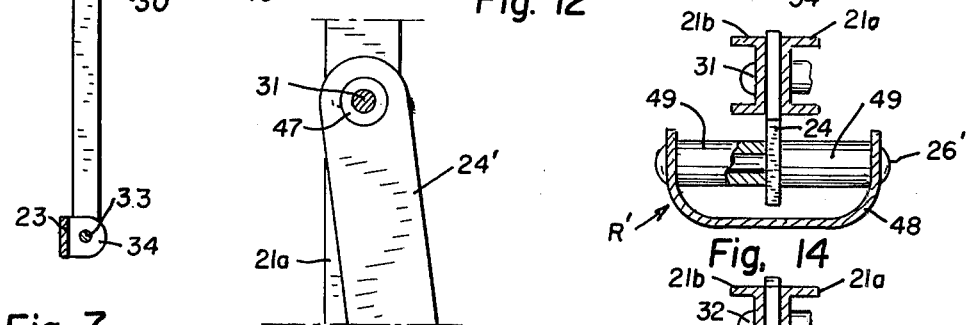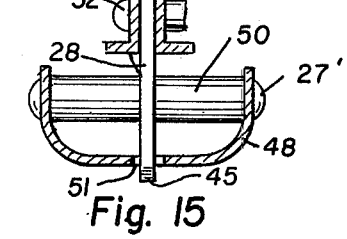

FOLDABLE HAND RAIL

This invention relates to hand rails for stair steps, and more particularly to foldable hand rails, as for camper trailers.

A large number of camper trailers and mobile homes are used by vacationers, construction personnel and retirees who move about the country. Many types of camper trailers are available and all are box-like, wheel-mounted living units capable of being towed by an automobile or truck. Since they are to be towed on public roads and highways, these campers are restricted in width and usually, they are within a few inches of being as wide as the law will allow.

Many, if not most, of these trailer campers have side door entrances, and whenever a trailer is in use, as at a campground, access will be at this door. Usually, there will be several steps at the entrance because the floor of the wheel-mounted trailer will be several feet above the ground level. Such stair steps may be built into the trailer structure as retractable steps, or a box-like platform independent of the trailer may be used.

Although hand rails are commonly associated with stair steps, there are no hand rails on travel trailers, apparently because only a few steps are required and also, because the width limitations of a trailer render hand rails undesirable. This does overlook the fact that many trailer users are elderly people who need the support which a hand rail can offer, and that, at times, everyone can find a hand rail beneficial for walking up and down stair steps.

When a platform stariway is used, a railing may be built upon the platform but this is somewhat expensive and very difficult to handle when the camper trailer is to be moved. A hand rail has been proposed which is mounted alongside the trailer entrance to swing over the door or against the side of the trailer when it is not in use, and while this hand rail can thus be closely against the trailer to avoid the restriction as to trailer width, it has proven to be unsatisfactory as being too unwieldy.

Therefore, there is a real and definite need for an improved and simplified hand rail for the stair steps of a camper trailer which can be folded up to a snug package against the side of the trailer whenever it is not in use, but which can be quickly and easily projected outwardly and downwardly when it is needed. The present invention was conceived and developed with the foregoing considerations in view, and the invention comprises, in essence, a lightweight hand rail structure pivotally mounted upon the outside wall of a camper trailer to swing downwardly and close to the wall of the trailer in a compact arrangement when it is retracted, and to swing outwardly therefrom at a suitable inclination to match the stairs. This hand rail is supported by a strut normally carried underneath the hand rail to be attached to the hand rail by an arm which swings back and forth as the hand rail is extended and retracted.

It follows that the objects of the invention are to provide a novel and improved hand rail for a trailer camper which: can be retracted against the side of the trailer without extending therefrom a distance sufficient as to cause a violation of road width limitations; can be easily and quickly swung to an outward inclination for use with stair steps; can be quickly and easily installed on practically any type of trailer; and is a neat-appearing, light-weight, strong and durable unit.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 1 is an isometric view of a camper trailer having a side door entrance, with the improved hand rail mounted alongside the door and being folded against the side of the trailer as for travel.

FIG. 2 is a perspective view of the central side portion of the camper trailer shown at FIG. 1, to depict the side door entrance, with the door being open, stairway steps in place and the improved hand rail being extended outwardly and downwardly at one side of the doorway.

FIG. 3 is a side elevational view of the improved hand rail per se at its retracted position such as shown at FIG. 1, but on an enlarged scale.

FIG. 4 is a sectional front elevational view as taken from the indicated line 4—4 at FIG. 3.

FIG. 5 is a front elevational view of the hand rail shown at FIG. 3.

FIG. 6 is a side elevational view of the hand rail shown at FIG. 3, but at its extended position.

FIG. 7 is a side elevational view as taken from the indicated line 7—7 at FIG. 5, but on an enlarged scale.

FIGS. 8, 9 and 10 are sectional detail views as taken from the respective indicated lines 8—8, 9—9 and 10—10 at FIG. 7, but on a further enlarged scale.

FIG. 11 is a fragmentary isometric view of the portion depicted at FIG. 10 to better illustrate the structure of the latch component.

FIG. 12 is a sectional detail view as taken from the indicated line 12—12 at FIG. 5, but on an enlarged scale.

FIG. 13 is a fragmentary sectional detail of one of the pivot connections, but illustrating a modification thereof by using a spacer washer.

FIG. 14 is a fragmentary sectional detail similar to FIG. 9, but showing an alternate form of a hand rail.

FIG. 15 is a fragmentary sectional detail similar to FIG. 10, but showing the alternate form of a hand rail Referring more particularly to the drawing, the camper trailer T is exemplary of many of the different types of camper trailers in use which have the entrance E at the side of the body of the camper. This wheel-mounted camper trailer may include stair steps S below the entrance which will be retracted when the camper trailer is traveling, as at FIG. 1, but extended when the camper trailer is at a park or campground as at FIG. 2.

The improved hand rail R is affixed to the side wall of the camper trailer T alongside the entrance E of the camper trailer T. This hand rail R lies against the camper trailer side wall when retracted, FIG. 1, as for traveling, and outstands from the side wall of the camper when it is used. The extended hand rail R is sloped downwardly alongside one side of the stair steps, as at FIG. 2. It is to be noted that this hand rail R includes the rail 20 and a supporting strut 21 below the rail. Also, the rail 20 and strut 21 are pivotally carried in brackets 22 and 23, respectively, the bracket 22 being at the top of the rail 20 and the bracket 23 being at the bottom of the strut 21. These brackets are secured to the side wall of the camper trailer as by suitable lock screws, all as hereinafter set forth in detail.

The hand rail 20 is formed as a pair of lightweight, metal tubes 20a and 20b lying alongside each other in spaced parallelism. These tubes are spaced apart a distance sufficient to permit a throw arm 24, a flat bar, as hereinafter further described, to lie between them. These tubes are held together by spacer pins extending through them. These pins may be rivets or bolts of any suitable type which have heads or enlarged ends to hold them in place.

A top pivot pin 25 is located at the top end of the rail 20 which extends through the sides of the bracket 22 to pivotally connect the rail thereto. An intermediate pivot pin 26 is located at the approximate lower one-third point of the rail to pivotally carry one end of the throw arm 24. A lower, spacer pin 27 is located near the bottom end of the hand rail to space the tubes apart and to receive a latch 28 which will hold the hand rail in place when it is retracted as best shown at FIG. 7. The top pivot pin 25 and the lower spacer pin 27 may include spacer washers 29 to hold the tubes a proper distance apart, and these spacer washers 29 are the same in thickness as the thickness of the throw arm 24. To complete the hand rail 20, plastic end caps 30 may be used to protectively cover the ends of the tubes 20a and 20b.

The supporting strut 21 is formed as a pair of back-to-back channel members 21a and 21b lying alongside each other in spaced parallelism. These channels are spaced apart a distance sufficient to permit the throw arm 24 to lie between them, and thus, are spaced apart the same distance as the spacing of hand rail tubes 20a and 20b. These channels 21a and 21b are held together by spacer pins extending through them. These pins may be bolts or rivets of any suitable type having enlarged heads to hold them in place.

A top pivot pin 31 is located at the top of the channels 21a and 21b to carry the end of the throw arm 24 opposite to the connection of that arm to the rail 20. An intermediate pivot pin 32 is located at the approximate lower third point of the channels 21a and 21b to carry the latch 28. A lower pivot pin 33, shown as a bolt and nut, is located at the bottom of the channels and this pin connects with an ear 34 of the lower bracket 23 as hereinafter described.

The upper bracket 22 is formed as a box-like member having a back wall 35 to fit against the wall of a camper trailer T. Screw holes are located in this back wall to receive mounting screws 36, as shown. Sidewall members 37 embrace the top end of hand rail R and carry the pivot pin 25. A top member 38 completes the bracket. This bracket may be manufactured in various ways, a simple mode of manufacture being by folding sheet metal so that the sides and top join at the corners of the unit and the back wall 35 is formed by infolded and downfolded tabs from the side walls and top wall.

The lower bracket 23 is formed as a horizontally extended strap which fits against the wall of a camper trailer T. Screw holes are located in this strap to receive mounting screws 39 as shown. The ear 34 outstands from one end of this bracket to hold the lower end of the channels 21a and 21b by a pivot 33, as heretofore described. A corresponding ear 40 outstands from the opposite end of the bracket to hold a lateral stabilizer strap 41 as by a pivot pin 42. The pin 42 is shown as a bolt and nut similar to the pin 33, although it is to be understood that both of these pins may be otherwise, providing that they function to hold the components in place and serve as a pivot shaft about which the components swing. The stabilizer strap 41 extends upwardly and at an inclination to connect with the strut 21 at a point immediately below the intermediate pivot, as with a rivet 43, as best shown at FIG. 11. The stabilizer strap thus functions to limit lateral movement of the hand rail when it is extended.

The throw arm 24 is a flat bar which lies between the hand rail tubes 20a and 20b and between the strut channels 21a and 21b and it is connected to these members by pivot pins 26 and 31, respectively. The length of this arm is somewhat less than one-third the length of the hand rail 20 and is such as to permit the hand rail 20 and strut 21 to lie together when the unit is retracted and folded against the side of a camper trailer as best shown in FIG. 7. When the hand rail 20 is to be extended, it is lifted sufficiently high as to permit the throw arm 24 to swing about the end of the strut 21 and place the end of the strut near the extended end of the hand rail as best shown at FIG. 6. When the hand rail is so extended, the strut 21 supports the hand rail 20 and loads upon it while the stabilizer strap 41 supports the hand rail against lateral forces.

The latch 28 is formed as a flat bar pivoted upon the pin 32 as heretofore described. The latch includes a simple hook 44 which overreaches the pivot pin 27 and an wahser 29 upon it. As best shown at FIG. 11, the point 45 of the hook has an inclined undersurface for easy slide action to move over and then upon the pin 27 when the unit is being retracted by pressing the hand rail R against the strut. Also, the point 45 of the hook extends a short distance beyond the hand rail 20 so that it may be easily reached and lifted from the pin 27 when the hand rail is to be extended. To complete the latch, a side abutment 46 is formed in the latch, as best shown at FIG. 11, to engage the side of a support strut channel 21b to prevent the latch from falling out of place when the rail is extended.

The manner in which this hand rail R is to be used is manifest from the foregoing description. It is extended when in use and retracted when not used. Although illustrated as being used at the left hand side of a doorway opening, it is a simple matter to reverse the arrangement and use this hand rail at the right hand side of the doorway opening. The side of the doorway opening will, of course, be at the opposite side from which the door is hung, or, if a door which swings inwardly is used, the hand rail may be at either, or both, sides of the opening. It is also to be noted that this hand rail may be used at an entrance located at the rear of a camper when such an entrance is provided.

It is obvious that variations of structural detail are possible to modify or improve the action of the unit. Where the pivot pins 26, 31, 32, 33 and 42 are rivets or similar members which tightly grip the components when set, a spacer, a small washer 47 similar to spacers 29, as shown at FIG. 8, may be used to hold the tubes 20a and 20b, or channels 21a and 21b apart. Accordingly, the throw arm 24, the latch 28 and ear 34 are pivoted on these respective washers to swing freely without the arm, latch or ear galling the tubes or channels at each side of them.

As an alternative to the pair of tubes 20a and 20b, a channel 48 may be used as the hand rail R', as shown at FIGS. 14 and 15. With this arrangement, the throw arm 24 must be centered between the flanges of the channel. Accordingly, spacer tubes 49 are fitted between the channel flanges upon the pivot pin 26' at each side of the throw arm 24 as shown at FIG. 14. The lower spacer pin 27' must also be fitted with a spacer tube 50 extending completely across the space between the channel flanges to engage the latch 28. A suitable slot 51 must be cut into the face of this channel 48 to permit the point 45 of the latch to be reached by a user of the hand rail.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

What is claimed is:

1. A foldable hand rail assembly to be placed alongside the side entrance of a camper trailer and comprising, in combination therewith:
   a. a first bracket affixed to the side wall of the trailer alongside the trailer entrance and at a suitable height above the floor of the trailer for holding the top end of a hand rail;
   b. a hand rail pivotally mounted upon said first bracket to hang therefrom alongside the trailer wall whenever it is retracted, but to swing outwardly therefrom whenever it is extended;
   c. a second bracket affixed to the side wall of the trailer below the first mentioned bracket at a height near the floor of the trailer; and
   d. a strut below the hand rail pivotally connected to said second bracket to upstand alongside the trailer wall when it is retracted and to swing outwardly therefrom to engage and support the hand rail at its extended position.

2. The hand rail defined in claim 1, wherein:
the hand rail overlies the strut when both members are retracted; and
a latch on the strut member engaging the hand rail when so retracted.

3. The hand rail defined in claim 1, wherein:
the hand rail overlies the strut when both members are retracted; and
a throw arm connecting the hand rail and strut with one end of the throw arm connecting with a pivot at the extended end of the strut and the other end of the throw arm connecting with the hand rail at a point spaced from the extended end of the hand rail a distance which is slightly greater than the length of the throw arm.

4. The hand rail defined in claim 3, wherein:
said throw arm is a flat bar;
a flat bar latch on the strut member engaging the hand rail when it is retracted, and wherein:
the hand rail is formed as a pair of tubes held together in spaced parallelism by pivot pins, with the spacing between them sufficient to receive the flat-bar throw arm and the latch.

5. The hand rail defined in claim 4, wherein:
the strut is formed as two members held together in spaced parallelism by pivot pins and at a spacing to receive the flat bar throw and the latch between the members.

6. The hand rail defined in claim 1, wherein:
said second bracket includes a lateral stabilizer strap to restrain the hand rail against lateral movement when it and the strut are interconnected.

* * * * *